US012373444B1

(12) United States Patent
Ahn

(10) Patent No.: US 12,373,444 B1
(45) Date of Patent: Jul. 29, 2025

(54) METHOD AND SYSTEM FOR APPENDING A DATA TYPE COMBINATION REPORT TO SEARCH RESULTS OF A DATABASE QUERY

(71) Applicant: PRAXI DATA, INC., Hillsborough, CA (US)

(72) Inventor: Andy Tae Ahn, Hillsborough, CA (US)

(73) Assignee: PRAXI DATA, INC., Hillsborough, CA (US)

( * ) Notice: Subject to any disclaimer, the term of this patent is extended or adjusted under 35 U.S.C. 154(b) by 30 days.

(21) Appl. No.: 18/181,524

(22) Filed: Mar. 9, 2023

(51) Int. Cl.
*G06F 16/245* (2019.01)
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
CPC .......................... G06F 16/24578; G06F 16/248
See application file for complete search history.

(56) References Cited

U.S. PATENT DOCUMENTS

2019/0272296 A1* 9/2019 Prakash ................ G06F 16/243

* cited by examiner

*Primary Examiner* — Truong V Vo
(74) *Attorney, Agent, or Firm* — K&L Gates LLP

(57) ABSTRACT

Disclosed herein are a method, system, and apparatus for appending a data type combination report to search results in response to receiving a database query to a database. When a user submits the database query to the database for a designated combination of data types, a data management system must ensure that presenting the designated combination of data types to the user does not violate applicable privacy laws. A data type combination report advises the user of any issues regarding the distribution of the results of a set of data types.

20 Claims, 6 Drawing Sheets

METHOD AND SYSTEM FOR APPENDING A DATA TYPE COMBINATION REPORT TO SEARCH RESULTS OF A DATABASE QUERY

INCORPORATION BY REFERENCE

This application discloses a number of improvements over and enhancements to the data discovery solution for data curation disclosed in the inventor's U.S. Pat. No. 10,795,899, the contents of which is incorporated herein by reference.

BACKGROUND OF THE INVENTION

Data Curation is a means of managing data that makes the data more useful for users engaging in data discovery and analysis. Data Curation includes data identification/discovery, data authentication, archiving, management, preservation, retrieval, representation and other enrichment. During this process, data might be annotated, tagged, presented, and published for various purposes. The goal is to add to the value of data so that the data can be reused in as many business applications as possible. Curation also involves categorization as well-primarily to make the data searchable as well as to allow proper handling as in the case for sensitive personal data or financial data.

Data curation was much more manageable when enterprises only had a few data sources and moderate volume to extract business insights from. With the proliferation of big data, enterprises have many more disparate data sources to extract data from (typically referred to as volume, variety and velocity), causing difficulties in maintaining a consistent method to curate data. Further complicating the problem is the fact that much of today's data is created in an ad hoc way that can't be anticipated by the people intended to use data for analysis.

Some companies use artificial intelligence sometimes called machine learning or deep learning to create identification models which can then be used to automatically discover and categorize large amounts of data. However, these solutions are limited by the expertise needed to create models and to computing resources that can be employed for complicated workflows. Further, the results of machine learning need to be validated to reduce the number of false positives to a manageable amount so that there can actually be value from these insights.

DETAILED DESCRIPTION

Discussed below are examples of a method, system, and apparatus for appending a data type combination report to search results in response to receiving a database query to a database. With the proliferation of big data and evolving privacy compliance laws, data management systems often face the problem of complying with privacy laws when presenting a certain combination of data types to users. When a user submits the database query to the database for a designated combination of data types, a data management system must ensure that presenting the designated combination of data types to the user does not violate applicable privacy laws. A data type combination report advises the user of any issues regarding the distribution of the results of a set of data types.

The present invention addresses the problem by generating a data type combination report in response to receiving a database query. After generating search results that include data organized into a set of data types specified in the database query, the data management system identifies connections among the set of data types and evaluates combinations of data types with either a trained model that recognizes the data types or a heuristic model. In some embodiments, instead of receiving a database query, the data management system receives a document containing multiple data types. The data management system uses the trained model or the heuristic model to identify all data types in the document and evaluate combinations of data types. The data management then generates the data type combination report that summarizes the evaluation of the combinations of data types and identifies any issues regarding the combinations. In some embodiments, the data type combination report is generated by the trained model that recognizes the data types or the heuristic model. In order to ensure the entire data curation process is privacy compliant, the data management system simply reads the data types from the database and generates the data type combination report instead of copying the data types into the report. In addition to identifying the connections among the set of data types, the data type combination report presents an instantaneous decision on whether the set of data types is compliant with relevant privacy laws. The report is then linked to the search results, and both the search results and the data type combination report are provided to the user.

In the following description, for the purposes of explanation, numerous specific details are set forth in order to provide a thorough understanding of the embodiments of the invention. One skilled in the art may recognize that the embodiments of the invention may be practiced without these specific details or with an equivalent arrangement. In other instances, well-known structures and devices are shown in block diagram form in order to avoid unnecessarily obscuring the embodiments of the invention.

Figure 1:
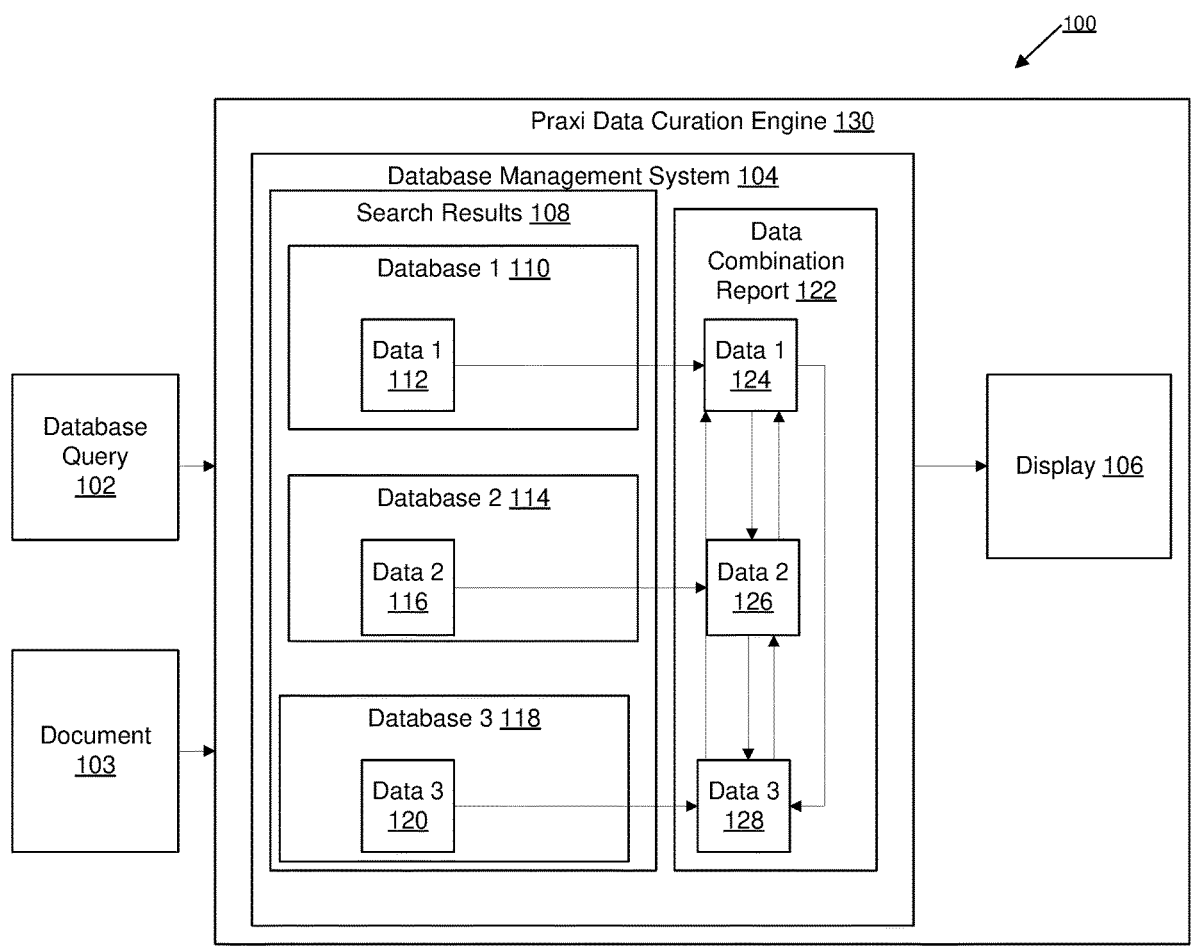
FIG. 1 is an illustration of a data curation engine generating a display of search results and a data type combination report in response to receiving a database query.

FIG. 1 is an illustration of a data curation engine 130 generating a display of search results and a data type combination report in response to receiving a database query. The sample illustrated is a simplistic implementation utilizing relatively few, and easy to recognize features of the data curation engine.

In the example, the data curation engine 130 is configured with a database management system 104 and a display device 106 to respond to a database query 102. The database query 102 specifies a set of data types to include in search results.

In response to receiving the database query 102, the database management system 104 is configured to generate search results 108 including data organized into the set of data types specified in the database query 102. The search results 108 as configured in the example includes three databases: database 110A, database 110B, and database 110C, each of the database configured to store a single data type. Data 112A, data 112B, and data 112C each represents data of a different data type. The database management system 114 generates a data type combination report 122 that identifies resulting connections of the set of data types included in the search results 108. In generating the data type combination report 122, the database management system 104 simply reads the data types from the databases and generates the data type combination report 122 instead of copying the data types into the data type combination report 122. In the example, data 124A, data 124B, and data 124C are pointers to data 112A, data 112B, and data 112C, respectively, and do not contain the actual data.

The data type combination report 122 also includes analysis of each of the combinations of the set of data types and identifies any privacy compliance issues associated with each of the combinations of the set of data types. The data curation engine 130 then displays the search results 108 and the data type combination report 122 through the display device 106. In one example, the data type combination report 122 includes an analysis that combines data types of ethnicity and geolocation identifying an individual's location to generate targeted advertisements is compliant with the California Consumer Privacy Act (CPRA). The data type combination report 122 also includes that the combination of data types of ethnicity and geolocation is prohibited under the General Data Protection Regulation (GDPR) because ethnicity is classified as sensitive personal data that requires extra security.

In another example, the data type combination report 122 identifies that the CPRA generally prohibits storing and sharing, internally or externally, a combination of data types of age, sex, and zip code. However, the data type combination report 122 can also include that exemptions may apply where law enforcement agencies, such as police and sheriff's departments, may direct an entity pursuant to a law enforcement agency-approved investigation with an active case number to store the prohibited combination of data types for 90 days in order to allow the law enforcement agency to obtain a court-issued subpoena, order, or warrant to obtain an individual's personal information.

In another example, the data type combination report 122 identifies that a combination of data types of vehicle information and ownership information shared externally for the purpose of effectuating, or in anticipation of effectuating, a vehicle repair covered by a vehicle warranty or a recall is compliant with the CPRA. The data type combination report 122 also includes whether the combination of data types of vehicle information and ownership information is compliant with privacy laws of other jurisdictions, such as the GDPR or the Utah Consumer Protection Act.

In some embodiments, instead of receiving the database query 102, the database management system 104 of the data curation engine 130 receives a document 103 containing one or more data types. The data types in the document 103 are undefined, so the data curation engine 130 is tasked with identifying a set of data types in the document 103. After identifying the set of data types in the document 103, the database management system 104 identifies resulting combinations of the set of data types in the document 103 and generates a data type combination report 114 that identifies any privacy compliance issues associated with each of the combinations of the set of data types in the document 103. The identifies set of data types in the document 103 and the data type combination report 114 are linked together and displayed through the display device 106.

Figure 2:
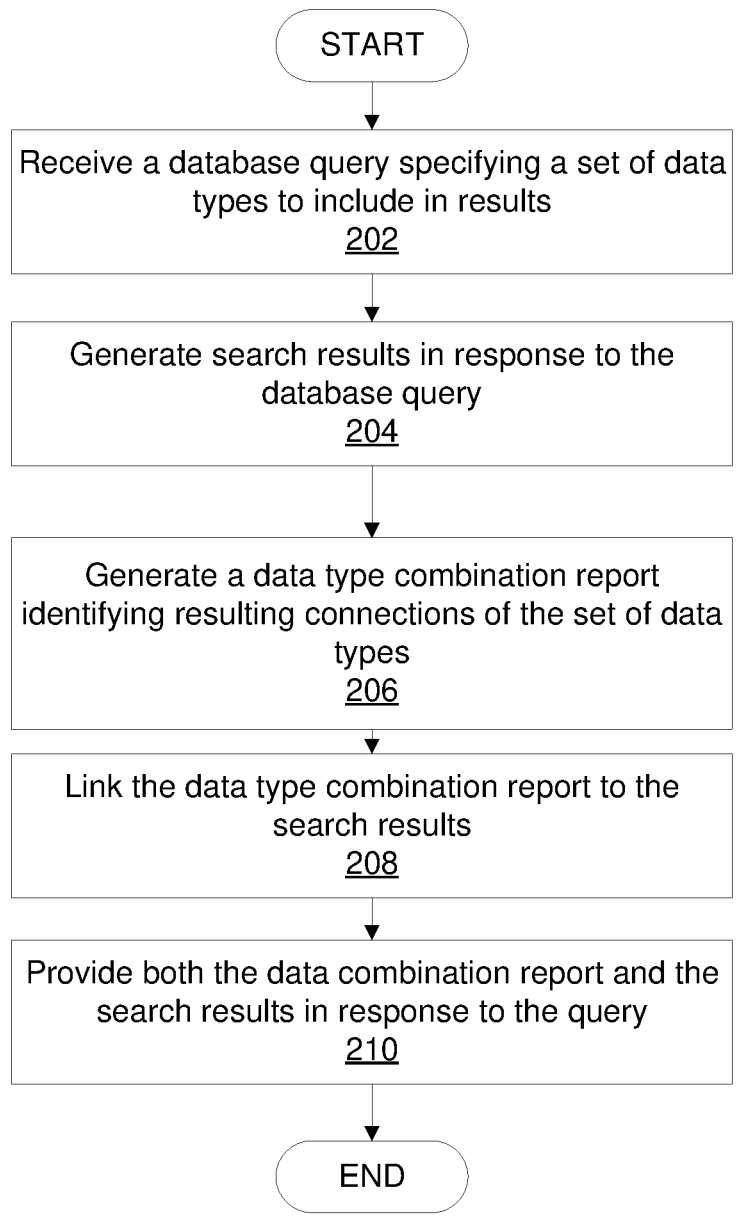
FIG. 2 is a flowchart illustrating appending a data type combination report to search results in response to receiving a database query to a database.

FIG. 2 is a flowchart illustrating appending a data type combination report to search results in response to receiving a database query to a database. In step 202, a database management system receives a database query to a database configured to store one or more data types. The database query specifies a set of data types to include in results of the database query.

In some embodiments, the one or more data types include character strings, integers, and Boolean. In another embodiment, the one or more data types include types of data associated with one or more individuals. Examples include a name of an individual, physical address, email address, telephone number, date of birth, credit or debit card number, driver's license number, or Social Security number.

In some embodiments, the database query relates to multiple databases each configured to store a single data type. For example, the database query requests that data types physical address and date of birth be included in the results of the database query. The database query searches a first database storing physical address and subsequently searches a second database storing date of birth.

In step 204, the data management system generates search results in response to the database query. The search results include data organized into the set of data types specified in the database query.

In step 206, the data management system generates a data type combination report that identifies resulting connections of the set of data types included in the search results. The data management system generates the data type combination report by first identifying all possible combinations of the set of data types included in the search results. After identifying the possible combinations, the data management system determines whether each of the combinations of the set of data types are in compliance with relevant preset rules. The preset rules include privacy regulations such as the CPRA of the GDPR. For example, if the search results include data types A, B, and C, the data management system determines that data type combinations A+B, A+C, B+C, and A+B+C exist. After determining that the relevant rule is GDPR, the data management system then analyzes whether each of the data type combinations is in compliance with the GDPR and includes the analysis of the data type combinations in the data type combination report.

In some embodiments, the data type combination report includes how a particular combination of data types for a particular purpose may be compliant with one privacy regulation but not with another privacy regulation. For example, the data type combination report includes an analysis that a combination of data types of ethnicity and geolocation is compliant with the CPRA but not with GDPR. In another example, the data type combination report identifies that a combination of data types of age, sex, and zip code is generally prohibited by the CPRA but that exemptions apply when law enforcement agencies request storing and sharing of the combination of data types. In another example, the data type combination report identifies that a combination of data types of vehicle information and ownership information can be shared externally to effectuate vehicle repairs covered by a warranty or a recall under the CPRA. The data type combination report also indicates how other privacy laws regulate such combination of data types.

In order to ensure the entire data curation process is privacy compliant, the data management system simply reads the data types from the database and generates the data type combination report instead of copying the data types into the report. For example, the data management system refers to the data types by using pointers that identify locations of the data types in the database.

In step 208, the data management system links the data type combination report to the search reports. In step 210, the data type combination report and the search results are provided in response to the database query. In some embodiments, in addition to determining whether the each of the combinations of the set of data types are in compliance with a relevant privacy regulation, the data management system include information about compliance issues with other privacy regulations relating to each of the combinations of the set of data types. For example, in response to a database query of a combination of data types of age, sex, and zip code under the CPRA, the data management system includes information about how privacy regulations in other jurisdictions, such as the GDPR or the Utah Consumer Privacy Act, regulate the combination of data types of age, sex, and zip code.

Figure 3:
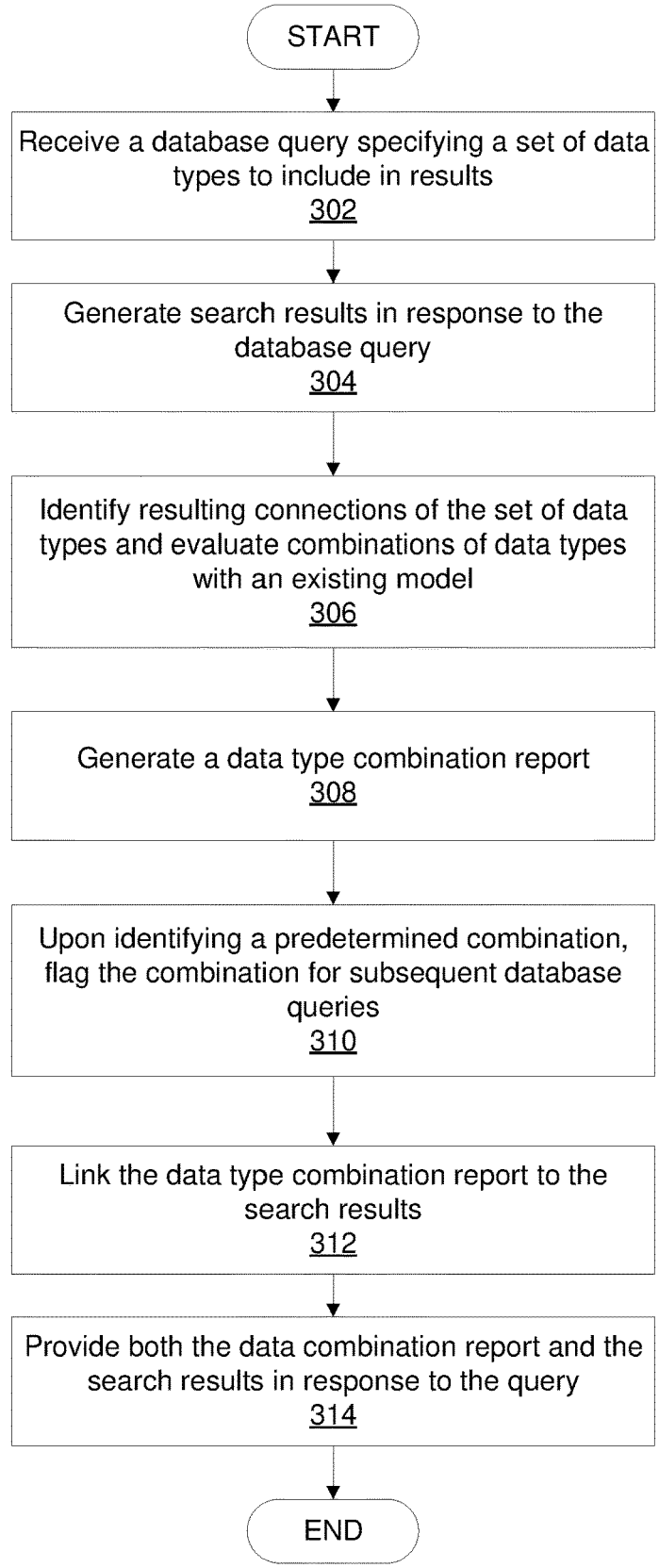
FIG. 3 is a flowchart illustrating appending a data type combination report to search results wherein the data type combination report evaluates combinations of data types using an existing model.

FIG. 3 is a flowchart illustrating appending a data type combination report to search results wherein the data type combination report evaluates combinations of data types using an existing model. Steps 302 and 304 are similar to steps 202 and 204 of FIG. 2. In step 302, a database management system receives a database query to a database configured to store one or more data types. The database query specifies a set of data types to include in results of the database query. In step 304, the data management system generates search results in response to the database query. The search results include data organized into the set of data types specified in the database query.

In step 306, the data management system identifies resulting connections of the set of data types included in the search results. After identifying all possible combinations of the set of data types included in the search results, the data management system evaluates each of the combinations of the set of data types with an existing model.

In one embodiment, the existing model is a trained model that recognizes the set of data types. In some embodiments, the trained model is a model created by a machine learning system of FIG. 6. Examples of training data include supervised sets of documents with multiple labeled datatypes. Data type labelling originates via mechanical turks, or another labelling model such as a few shot model that recognizes language elements. The machine learning system performs deep learning (also known as deep structured learning or hierarchical learning) directly on multiple database queries to learn more information about the set of data types. In another embodiment, the existing model is a heuristic model. The heuristic model is created by storing and analyzing previous database queries and evaluates predetermined combinations based on predetermined rules.

In step 308, the database management system generates a data type combination report that summarizes the evaluation of the combinations of data types performed with the existing model and identifies any issues regarding the combinations.

In step 310, upon identifying a predetermined combination of the set of data types, the database management system flags the combination of the set of data types for subsequent database queries. For example, prior to responding to a database query, a database management system may flag a combination of data type A and data type B as potentially toxic. A toxic combination of data types is a combination of data types that cannot be used for a particular desired purpose under a privacy compliance law. Upon receiving a new database query and identifying the combination of data type A and data type B and confirming, through an evaluation with an existing model, that the combination is toxic, the database management system flags the combination of data type A and data type B as toxic. The database management system can then make an instantaneous decision upon receiving future database queries specifying a combination of data type A and data type B.

Steps 312 and 314 are similar to steps 208 and 210 of FIG. 2. In step 312, the data management system links the data type combination report to the search reports. In some embodiments, after flagging a toxic combination of data types, the data management system includes in the data type combination report which privacy compliance law is violated by the toxic combination, for what legitimate purposes the toxic combination can be used without violating the privacy compliance law, and a recommendation of data handling procedures to be followed to address privacy incompliance. In step 314, the data type combination report and the search results are provided in response to the database query.

Figure 4:
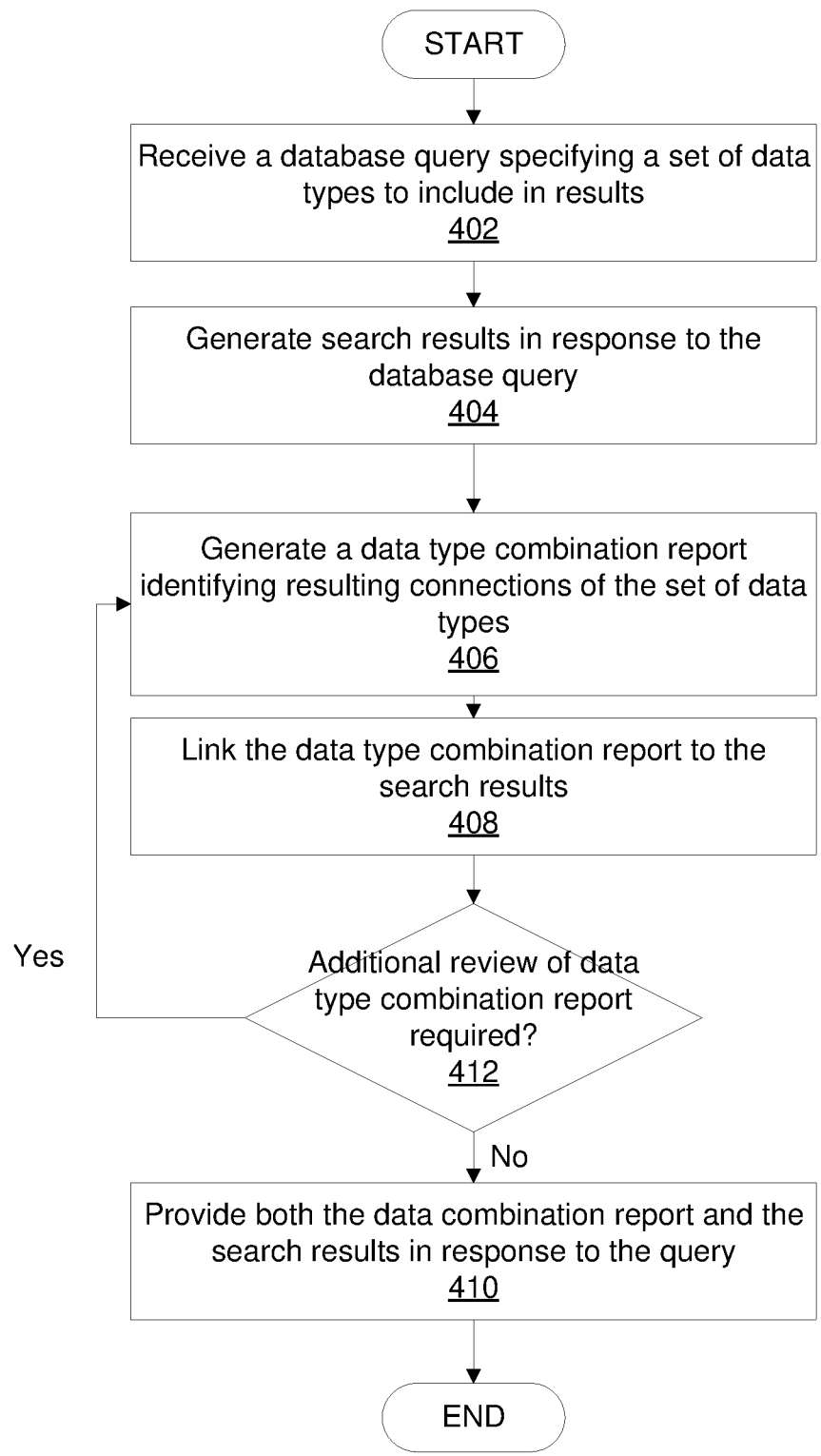
FIG. 4 is a flowchart illustrating appending a data type combination report to search results wherein a need for additional review prompts an additional data type combination report.

FIG. 4 is a flowchart illustrating appending a data type combination report to search results wherein a need for additional review prompts an additional data type combination report. Steps 402, 404, 406, and 408 are similar to steps 202, 204, 206, and 208 of FIG. 2.

In step 402, a database management system receives a database query to a database configured to store one or more data types. The database query specifies a set of data types to include in results of the database query. In step 404, the data management system generates search results in response to the database query. The search results include data organized into the set of data types specified in the database query. In step 406, the data management system generates a data type combination report that identifies resulting connections of the set of data types included in the search results. In step 408, the data management system links the data type combination report to the search reports.

In step 412, upon determining that additional review of data type combination report is required, the data management system returns to step 406 to generate another data type combination report identifying resulting connections of the set of data types. For example, when the data management system receives a database query specifying an unknown data type, the data management system will determine that additional review is required. In one embodiment, after a certain number of additional reviews of the data type combination report, the data management system returns a data type combination report explaining that the data management system is unable to identify the data types specified by the database query.

In step 410, the data type combination report and the search results are provided in response to the database query.

Computing Platform

Figure 5:
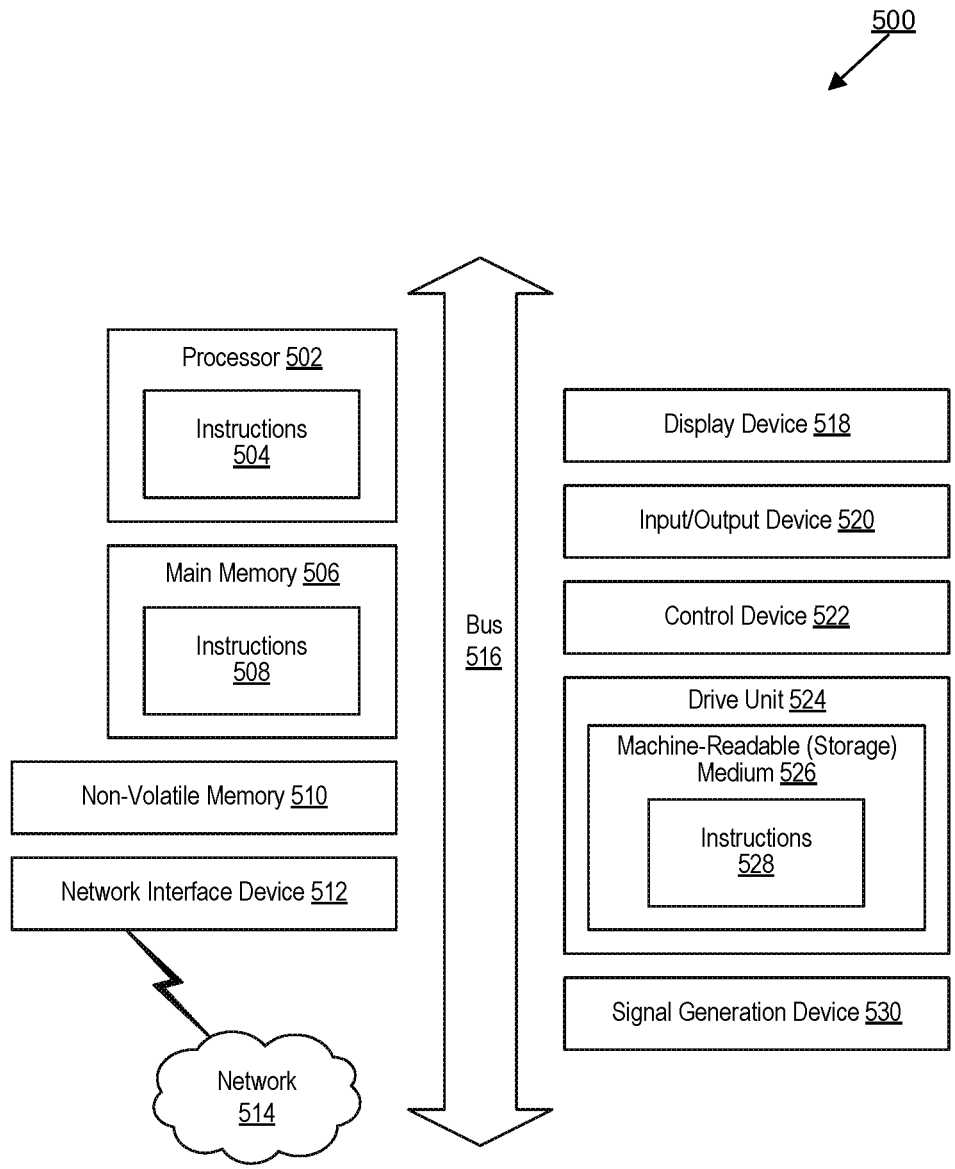
FIG. 5 is a block diagram of an exemplary computing system.

FIG. 5 is a block diagram illustrating an example computer system 500, in accordance with one or more embodiments. In some embodiments, components of the example computer system 500 are used to implement the software platforms described herein. At least some operations described herein can be implemented on the computer system 500.

The computer system 500 can include one or more central processing units ("processors") 502, main memory 506, non-volatile memory 510, network adapters 512 (e.g., network interface), video displays 518, input/output devices 520, control devices 522 (e.g., keyboard and pointing devices), drive units 524 including a storage medium 526, and a signal generation device 520 that are communicatively connected to a bus 516. The bus 516 is illustrated as an abstraction that represents one or more physical buses and/or point-to-point connections that are connected by appropriate bridges, adapters, or controllers. The bus 516, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 500 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 500.

While the main memory 506, non-volatile memory 510, and storage medium 526 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 528. The term "machine-readable medium" and "storage medium" shall also be taken to include any medium that is capable of storing, encoding, or carrying a set of instructions for execution by the computer system 500. In some embodiments, the non-volatile memory 510 or the storage medium 526 is a non-transitory, computer-readable storage medium storing computer instructions, which can be executed by the one or more central processing units ("processors") 502 to perform functions of the embodiments disclosed herein.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 504, 508, 528) set at various times in various memory and storage devices in a computer device. When read and executed by the one or more processors 502, the instruction(s) cause the computer system 500 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 510, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 512 enables the computer system 500 to mediate data in a network 514 with an entity that is external to the computer system 500 through any communication protocol supported by the computer system 500 and the external entity. The network adapter 512 can include a network adapter card, a wireless network interface card, a router, an access point, a wireless router, a switch, a multi-layer switch, a protocol converter, a gateway, a bridge, a bridge router, a hub, a digital media receiver, and/or a repeater.

The network adapter 512 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. A portion of the methods described herein can be performed using the example ML system 600 illustrated and described in more detail with reference to FIG. 6.

Machine Learning System

Figure 6:
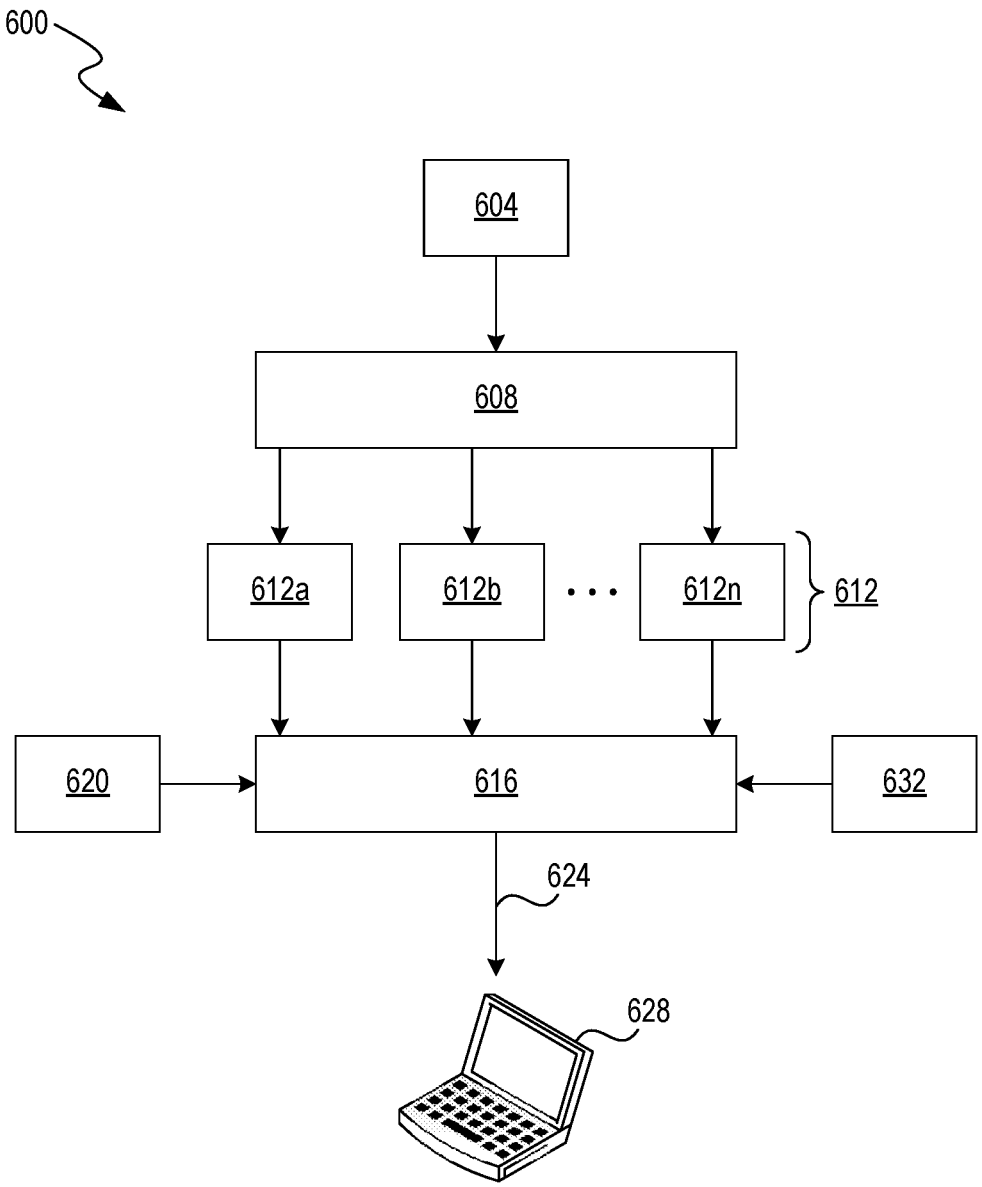
FIG. 6 is a block diagram illustrating an example machine learning (ML) system, in accordance with one or more embodiments.

FIG. 6 is a block diagram illustrating an example ML system 600, in accordance with one or more embodiments. The ML system 600 is implemented using components of the example computer system 500 illustrated and described in more detail with reference to FIG. 3. Likewise, embodiments of the ML system 600 can include different and/or additional components or be connected in different ways. The ML system 600 is sometimes referred to as a ML module.

The ML system 600 includes a feature extraction module 608 implemented using components of the example computer system 500 illustrated and described in more detail with reference to FIG. 5. In some embodiments, the feature extraction module 608 extracts a feature vector 612 from input data 604. For example, the input data 604 can include one or more images, sets of text, audio files, or video files. The feature vector 612 includes features 612a, 612b, . . . 612n. The feature extraction module 608 reduces the redundancy in the input data 604, e.g., repetitive data values, to transform the input data 604 into the reduced set of features 612, e.g., features 612a, 612b, . . . 612n. The feature vector 612 contains the relevant information from the input data 604, such that events or data value thresholds of interest can be identified by the ML model 616 by using this reduced representation. In some example embodiments, dimensionality reduction techniques, such as principal component analysis (PCA) or autoencoders are used by the feature extraction module 608.

In alternate embodiments, the ML model 616 performs deep learning (also known as deep structured learning or hierarchical learning) directly on the input data 604 to learn data representations, as opposed to using task-specific algorithms. In deep learning, no explicit feature extraction is performed; the features 612 are implicitly extracted by the ML system 600. For example, the ML model 616 can use a cascade of multiple layers of nonlinear processing units for implicit feature extraction and transformation. Each successive layer uses the output from the previous layer as input. The ML model 616 can learn in supervised (e.g., classification) and/or unsupervised (e.g., pattern analysis) modes. The ML model 616 can learn multiple levels of representations that correspond to different levels of abstraction, wherein the different levels form a hierarchy of concepts. In this manner, the ML model 616 can be configured to differentiate features of interest from background features.

In alternative example embodiments, the ML model 616, e.g., in the form of a CNN generates the output 624, without the need for feature extraction, directly from the input data 604. The output 624 is provided to the computer device 628. The computer device 628 is a server, computer, tablet, smartphone, smart speaker, etc., implemented using components of the example computer system 500 illustrated and described in more detail with reference to FIG. 5. In some embodiments, the steps performed by the ML system 600 are stored in memory on the computer device 628 for execution. In other embodiments, the output 624 is displayed on high-definition monitors.

A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 616 can be a CNN that includes both convolutional layers and max pooling layers. The architecture of the ML model 616 can be "fully convolutional," which means that variable sized sensor data vectors can be fed into it. For all convolutional layers, the ML model 616 can specify a kernel size, a stride of the convolution, and an amount of zero padding applied to the input of that layer. For the pooling layers, the ML model 616 can specify the kernel size and stride of the pooling.

In some embodiments, the ML system 600 trains the ML model 616, based on the training data 620, to correlate the feature vector 612 to expected outputs in the training data 620. As part of the training of the ML model 616, the ML system 600 forms a training set of features and training labels by identifying a positive training set of features that have been determined to have a desired property in question and a negative training set of features that lack the property in question. The ML system 600 applies ML techniques to train the ML model 616, that when applied to the feature vector 612, outputs indications of whether the feature vector 612 has an associated desired property or properties.

The ML system 600 can use supervised ML to train the ML model 616, with features from the training sets serving as the inputs. In some embodiments, different ML techniques, such as support vector machine (SVM), regression, naïve Bayes, random forests, neural networks, etc., are used. In one example embodiments, a validation set 632 is formed of additional features, other than those in the training data 620, which have already been determined to have or to lack the property in question. The ML system 600 applies the trained ML model 616 to the features of the validation set 632 to quantify the accuracy of the ML model 616. In some embodiments, the ML system 600 iteratively re-trains the ML model 616 until the occurrence of a stopping condition, such as the accuracy measurement indication that the ML model 616 is sufficiently accurate, or a number of training rounds having taken place.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method that appends a data type combination report to search results in response to receiving a database query to a database, wherein the database is configured to store one or more data types, the method comprising:
   receiving the database query to the database from a user, the database query specifying a set of data types to include in results thereto;
   generating search results in response to the database query, the search results including data organized into the set of data types specified in the database query;
   generating a data type combination report that identifies resulting connections of the set of data types included in the search results;
   linking the data type combination report to the search results; and
   providing both of the search results and the data type combination report linked thereto to the user.

2. The method of claim 1, further comprising:
upon identifying a predetermined combination of the one or more data types, flagging the identified predetermined combination for subsequent database queries.

3. The method of claim 1, wherein generating the search results further comprises:
accessing the one or more data types by reading data from the database.

4. The method of claim 1, wherein the database query relates to multiple databases.

5. The method of claim 4, wherein the set of data types specified in the database query determines which of the multiple databases are called by the database query.

6. The method of claim 1, wherein the data type combination report includes a recommendation on whether the resulting connections of the set of data types require additional review.

7. The method of claim 1, wherein the one or more data types includes character strings, integers, and Boolean.

8. The method of claim 1, wherein the one or more data types includes name, address, email, telephone number, date of birth, credit or debit card number, driver's license number, or Social Security number.

9. A non-transitory computer-readable storage medium storing instructions that append a data type combination report to search results in response to receiving a database query to a database, wherein the database is configured to store one or more data types, which, when executed by one or more data processors of a system, cause the system to:
receive the database query to the database from a user, the database query specifying a set of data types to include in results thereto;
generate search results in response to the database query, the search results including data organized into the set of data types specified in the database query;
generate a data type combination report that identifies resulting connections of the set of data types included in the search results;
link the data type combination report to the search results; and
provide both of the search results and the data type combination report linked thereto to the user.

10. The non-transitory computer-readable storage medium of claim 9 including further instructions which, when executed by the one or more data processors of the system, cause the system to:
upon identifying a predetermined combination of the one or more data types, flag the identified predetermined combination for subsequent database queries.

11. The non-transitory computer-readable storage medium of claim 9, wherein generating the search results further comprises:
accessing the one or more data types by reading data from the database.

12. The non-transitory computer-readable storage medium of claim 9, wherein the database query relates to multiple databases.

13. The non-transitory computer-readable storage medium of claim 12, wherein the set of data types specified in the database query determines which of the multiple databases are called by the database query.

14. The non-transitory computer-readable storage medium of claim 9, wherein the data type combination report includes a recommendation on whether the resulting connections of the set of data types require additional review.

15. A data system that appends a data type combination report to search results in response to receiving a database query to a database, wherein the database is configured to store one or more data types, the data system comprising:
at least one hardware processor; and
at least one non-transitory memory storing instructions, which, when executed by the at least one hardware processor, cause the data system to:
receive the database query to the database from a user, the database query specifying a set of data types to include in results thereto;
generate search results in response to the database query, the search results including data organized into the set of data types specified in the database query;
generate a data type combination report that identifies resulting connections of the set of data types included in the search results;
link the data type combination report to the search results; and
provide both of the search results and the data type combination report linked thereto to the user.

16. The data system of claim 15, where the data system is further instructed to:
upon identifying a predetermined combination of the one or more data types, flag the identified predetermined combination for subsequent database queries.

17. The data system of claim 15, wherein generating the search results further comprises:
accessing the one or more data types by reading data from the database.

18. The data system of claim 15, wherein the database query relates to multiple databases.

19. The data system of claim 18, wherein the set of data types specified in the database query determines which of the multiple databases are called by the database query.

20. The data system of claim 15, wherein the data type combination report includes a recommendation on whether the resulting connections of the set of data types require additional review.

* * * * *